US012600074B2

(12) United States Patent     (10) Patent No.:   US 12,600,074 B2

Snooks, Sr. et al.     (45) Date of Patent:     Apr. 14, 2026

(54) DEVICE AND METHOD FOR MAKING CONCRETE EXPANSION JOINT INSERTS

(71) Applicant: JD RUSSELL COMPANY, Utica, MI (US)

(72) Inventors: Charles Snooks, Sr., Shelby Township, MI (US); Bradley Danna, Shelby Township, MI (US); Nicholas Danna, Tucson, AZ (US); Marc Danna, Tucson, AZ (US)

(73) Assignee: JD RUSSELL COMPANY, Utica, MI (US)

( * ) Notice: Subject to any disclaimer, the term of this patent is extended or adjusted under 35 U.S.C. 154(b) by 126 days.

(21) Appl. No.: 18/296,233

(22) Filed: Apr. 5, 2023

(65) Prior Publication Data

US 2023/0311399 A1    Oct. 5, 2023

Related U.S. Application Data

(60) Provisional application No. 63/401,408, filed on Aug. 26, 2022, provisional application No. 63/327,523, filed on Apr. 5, 2022.

(51) Int. Cl.
    *B29C 48/86*       (2019.01)
    *B29C 48/00*       (2019.01)
          (Continued)

(52) U.S. Cl.
    CPC .......... *B29C 48/872* (2019.02); *B29C 48/022* (2019.02); *B29C 48/30* (2019.02);
          (Continued)

(58) Field of Classification Search
    CPC ..... B29C 48/872; B29C 48/022; B29C 48/30; B29C 48/865
    See application file for complete search history.

(56) References Cited

U.S. PATENT DOCUMENTS

| | | |
|---|---|---|
| 2,583,330 A | 1/1952 | Eckert |
| 5,312,573 A | 5/1994 | Rosenbaum et al. |

(Continued)

FOREIGN PATENT DOCUMENTS

| | | |
|---|---|---|
| DE | 10312693 B3 | 11/2004 |
| DE | 102015109597 A1 | 1/2017 |

(Continued)

OTHER PUBLICATIONS

International Preliminary Report on Patentability for International Application No. PCT/US2023/017604 mailed Oct. 17, 2024.

(Continued)

*Primary Examiner* — Christopher T Schatz

(74) *Attorney, Agent, or Firm* — Carlson, Gaskey & Olds, P.C.

(57) ABSTRACT

An illustrative example embodiment of a method of making a concrete expansion joint insert includes moving a material including a resin having a melt temperature through a die having a flow passage that ends in an exit having a selected geometry, increasing a temperature of only a segment of the die near the exit to an elevated temperature that is at least 1.5 times the melt temperature, and increasing the temperature of a portion of the material to an increased temperature above the melt temperature through contact with the segment having the elevated temperature.

10 Claims, 10 Drawing Sheets

(51) Int. Cl.
| | |
|---|---|
| *B29C 48/30* | (2019.01) |
| *B29C 48/88* | (2019.01) |
| *B29C 48/91* | (2019.01) |
| *B29K 21/00* | (2006.01) |

(52) U.S. Cl.
CPC ............ *B29C 48/865* (2019.02); *B29C 48/91* (2019.02); *B29C 48/911* (2019.02); *B29K 2021/00* (2013.01); *B29K 2995/0021* (2013.01)

(56) References Cited

U.S. PATENT DOCUMENTS

| | | | |
|---|---|---|---|
| 7,258,827 | B2 | 8/2007 | Shimada |
| 8,110,244 | B2 | 2/2012 | Nakamura et al. |
| 8,389,634 | B2 | 3/2013 | Yalvac et al. |
| 8,426,509 | B2 | 4/2013 | Abusleme et al. |
| 8,505,618 | B2 | 8/2013 | Ogawa et al. |
| 8,801,417 | B2 | 8/2014 | Nozawa et al. |
| 9,669,576 | B2 | 6/2017 | Gesper |
| 10,196,508 | B2 | 2/2019 | Chung et al. |
| 10,391,680 | B2 | 8/2019 | Tsujino et al. |
| 2011/0204535 | A1 | 8/2011 | Inoue |
| 2017/0292016 | A1* | 10/2017 | Chung .................... C08L 23/10 |
| 2018/0163349 | A1* | 6/2018 | Danna .................... E01C 11/04 |
| 2021/0214900 | A1 | 7/2021 | Danna et al. |

FOREIGN PATENT DOCUMENTS

| | | | |
|---|---|---|---|
| EP | 2121304 | B1 | 1/2015 |
| EP | 2585272 | B1 | 8/2017 |
| FR | 2781712 | A1 | 2/2000 |
| JP | 2004188742 | A | 7/2004 |
| JP | 2009000863 | A | 1/2009 |
| JP | 2012214041 | A | 11/2012 |
| TW | 1593537 | B | 8/2017 |
| WO | 2008135757 | A1 | 11/2008 |

OTHER PUBLICATIONS

International Search Report and Written Opinion for International Application No. PCT/US2023/017604 mailed Jul. 17, 2023.

* cited by examiner

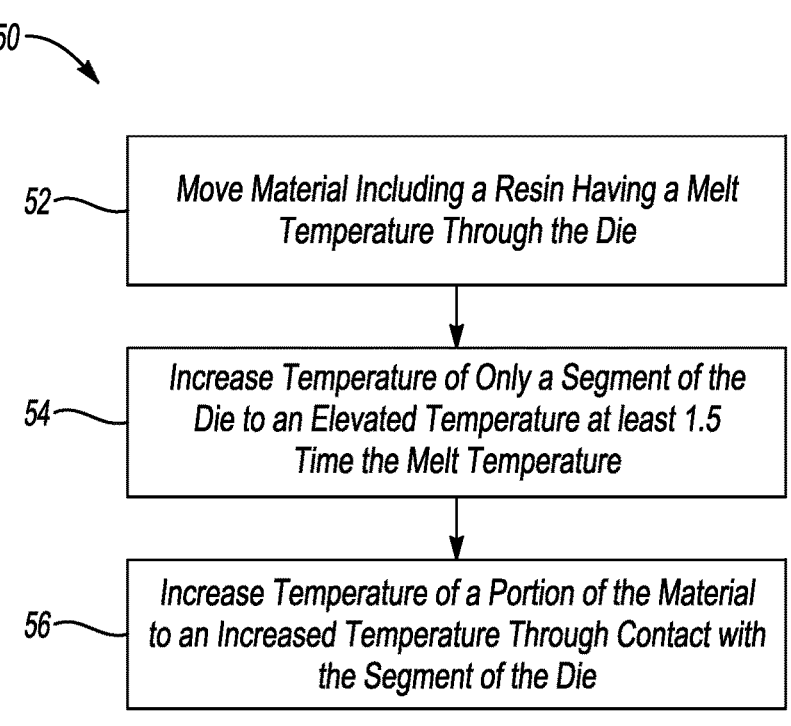
50
52 — Move Material Including a Resin Having a Melt Temperature Through the Die
54 — Increase Temperature of Only a Segment of the Die to an Elevated Temperature at least 1.5 Time the Melt Temperature
56 — Increase Temperature of a Portion of the Material to an Increased Temperature Through Contact with the Segment of the Die
_Fig-4_
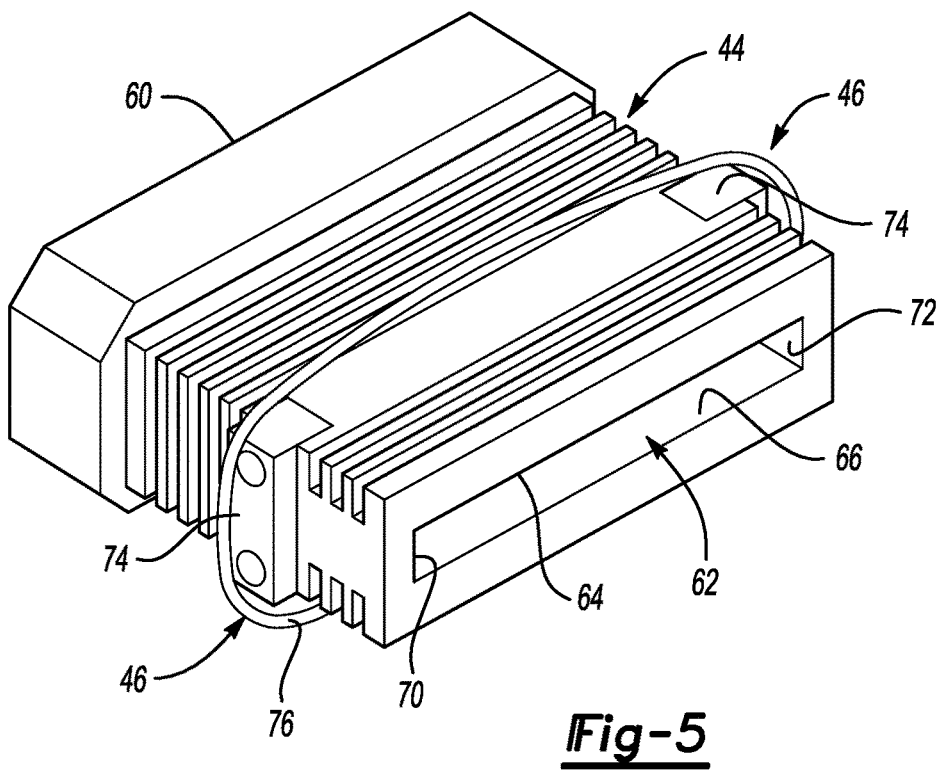
_Fig-5_

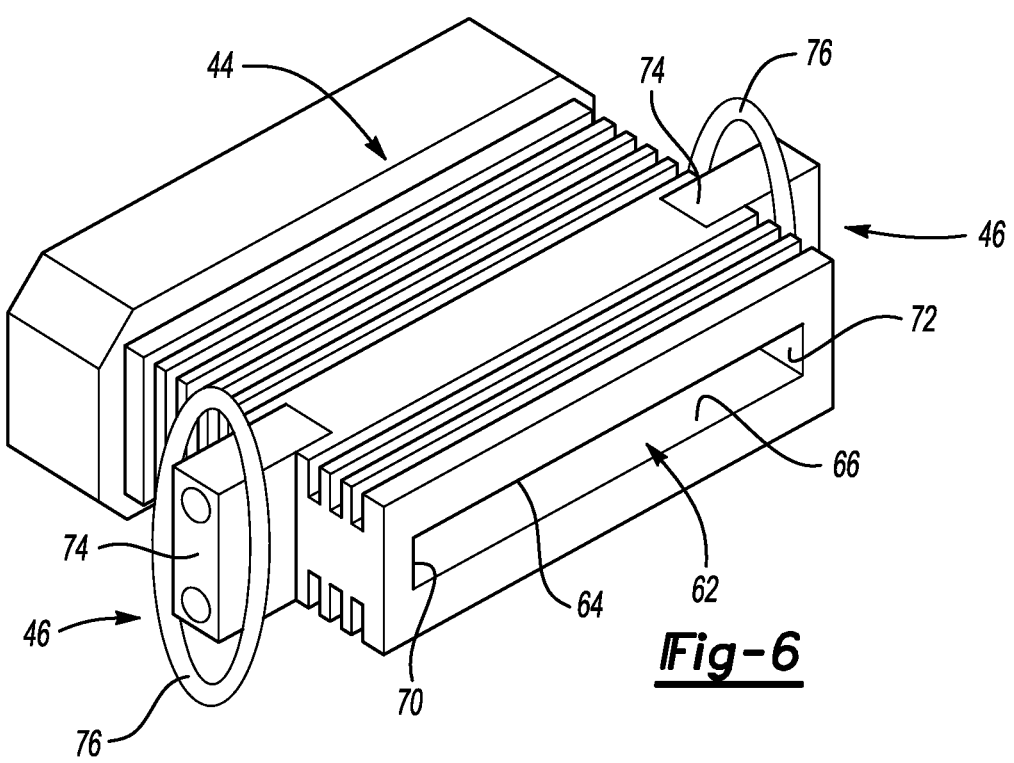
_Fig-6_
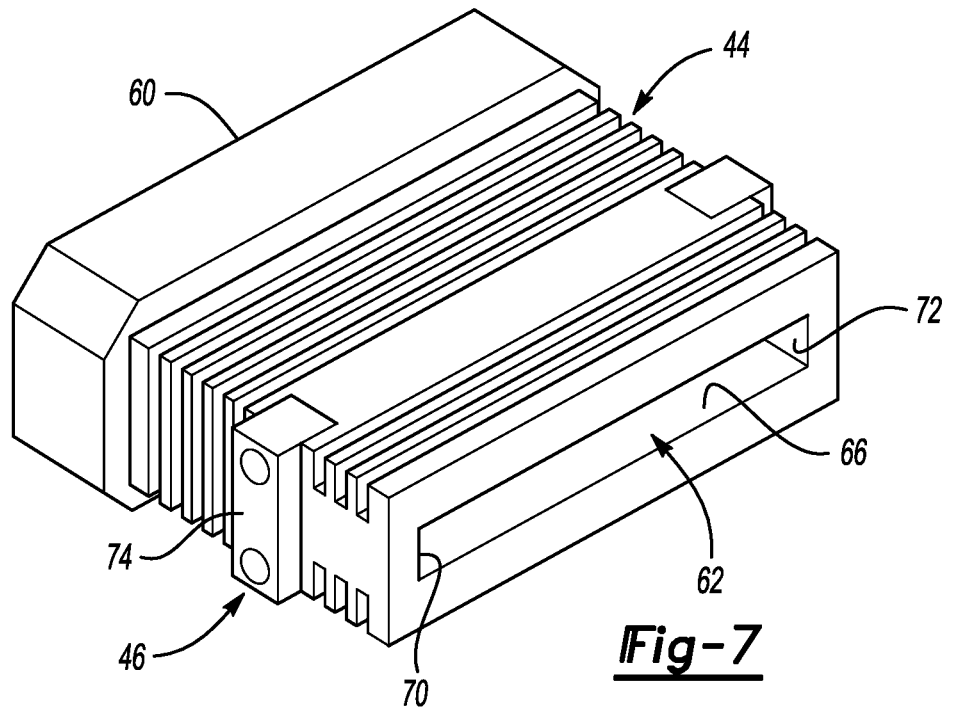
_Fig-7_

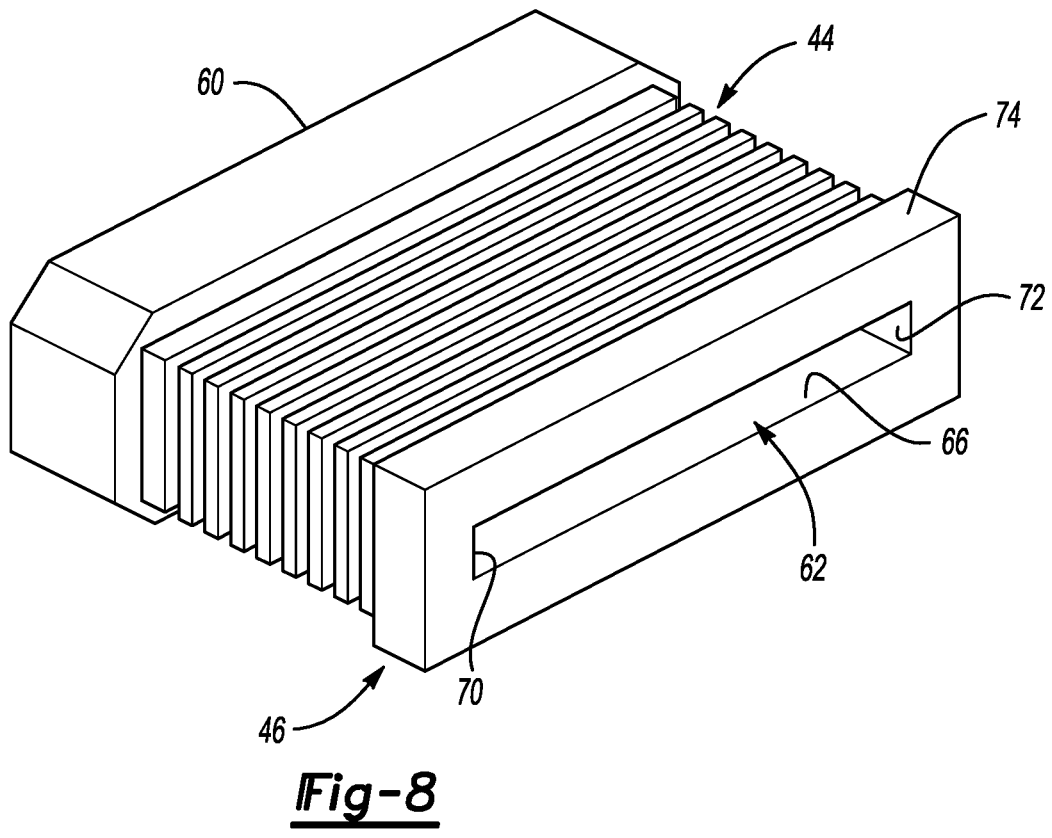
_Fig-8_
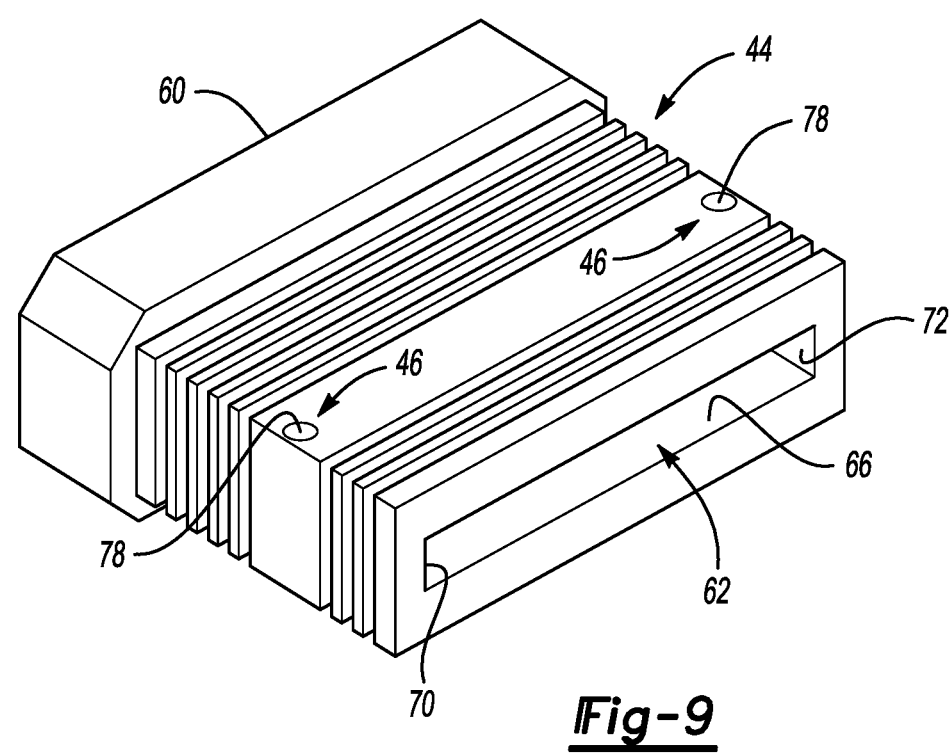
_Fig-9_

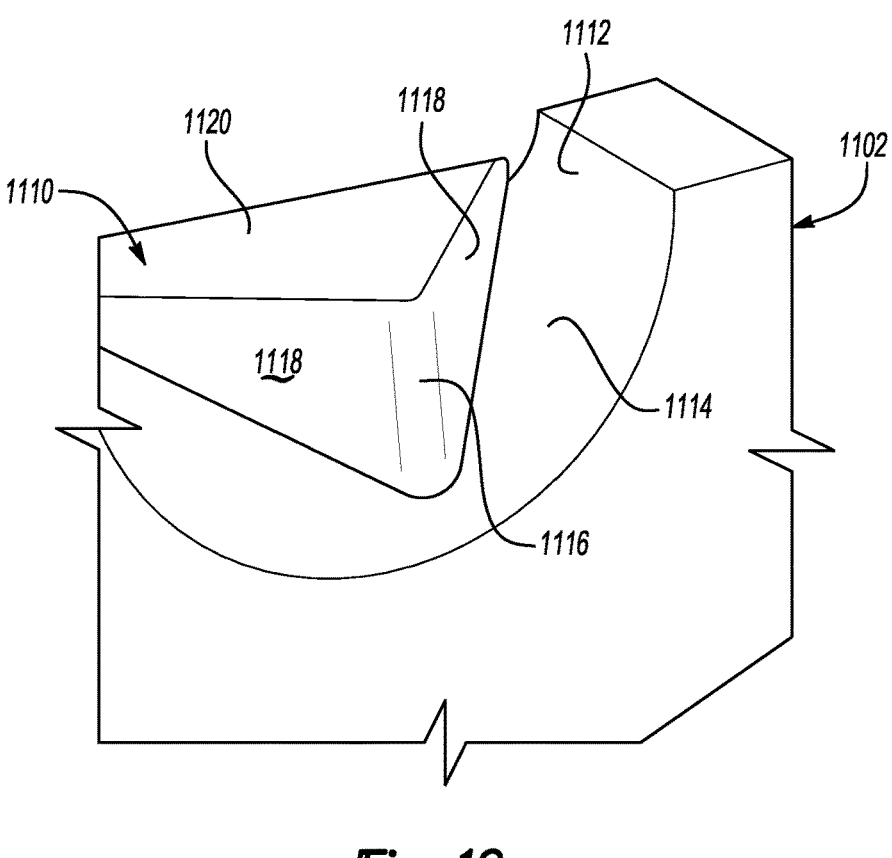
_Fig-19_
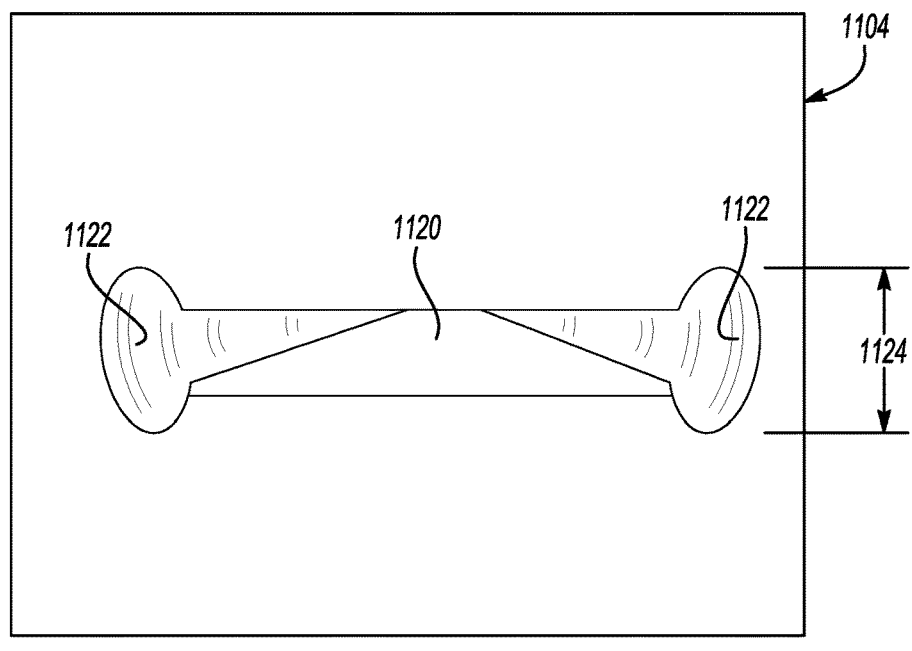
_Fig-20_

DEVICE AND METHOD FOR MAKING CONCRETE EXPANSION JOINT INSERTS

CROSS REFERENCE TO RELATED APPLICATIONS

This application claims priority to U.S. Provisional Application No. 63/327,523, which was filed on Apr. 5, 2022 and U.S. Provisional Application No. 63/401,408, which was filed on is Aug. 26, 2022, incorporated herein by reference.

BACKGROUND

Concrete has been in widespread use for a variety of surfaces, including roads and walkways. Given that concrete is a generally porous material and is exposed to changing weather conditions, expansion joints between sections or slabs of the concrete accommodate expansion and contraction of the concrete. Many expansion joints include an insert or filler within the space between the sections or slabs of concrete. Traditional expansion joint inserts were made using materials such as wood, paper and asphalt. More recently, recycled rubber expansion joint inserts were introduced.

U.S. Pat. No. 6,616,877 describes a technique for using recycled rubber, such as that available from used vehicle tires, for making concrete expansion joint material. According to the teachings of that document, relatively large sheets of recycled rubber-based material can be cut to a desired size for different installations to accommodate different thicknesses of concrete, for example.

One of the reasons that large sheets are made and cut is that it is very difficult to achieve an acceptable surface on all sides of the insert material as extruded. Cutting a sheet into strips provides a smooth or consistent finish on the cut edges of the insert. This approach involves additional processing to make the cuts and results in at least some waste material. Each of those factors increase manufacturing costs, which is undesirable

SUMMARY

An illustrative example embodiment of a method of making a concrete expansion joint insert includes moving a material including a resin having a melt temperature through a die having a flow passage that ends in an exit having a selected geometry, increasing a temperature of only a segment of the die near the exit to an elevated temperature that is at least 1.5 times the melt temperature, and increasing the temperature of a portion of the material to an increased temperature above the melt temperature through contact with the segment having the elevated temperature.

In addition to one or more of the features described above, or as an alternative, the material includes recycled rubber and the elevated temperature is high enough to at least partially melt at least some of the recycled rubber in the portion of the material.

In addition to one or more of the features described above, or as an alternative, the selected geometry is rectangular and the segment includes only two of four sides or the segment includes four sides.

In addition to one or more of the features described above, or as an alternative, increasing the temperature of the segment comprises using at least one of induction heating, plasma heating, cartridge heating, ultrasonic heating or flame heating.

In addition to one or more of the features described above, or as an alternative, the segment of the die includes a ferrous material on at least some of the segment, a remainder of the die comprises a non-ferrous material, at least one conductor is situated adjacent at least the ferrous material, and using induction heating comprises causing electrical current to flow along the at least one conductor.

In addition to one or more of the features described above, or as an alternative, the method includes introducing a second material into at least one side of the die.

In addition to one or more of the features described above, or as an alternative, the material establishes a first surface characteristic of a portion of the insert and the second material establishes a second surface characteristic along at least one lateral edge of the insert.

In addition to one or more of the features described above, or as an alternative, the material establishes a first color of a portion of the insert and the second material establishes a second color along at least one lateral edge of the insert.

In addition to one or more of the features described above, or as an alternative, the material comprises recycled rubber and a resin having a melt flow index that is in a range from 5 to 35 g/10 min.

In addition to one or more of the features described above, or as an alternative, the elevated temperature is in a range from 1.5 to 3 times the melt temperature.

In addition to one or more of the features described above, or as an alternative, the method includes adding a second material including resin to at least some of the portion of the material having the elevated temperature. The second material has a color that is different than the material.

In addition to one or more of the features described above, or as an alternative, the method includes heating the second material to a temperature that is lower than the elevated temperature.

An illustrative example embodiment of a device for making a concrete expansion joint insert includes a die defining a flow passage ending in an exit having a selected geometry. A heat source situated to heat only a segment of the die near the exit increases a temperature of the segment to an elevated temperature that is at higher than a temperature of a remainder of the die. The elevated temperature of the segment is at least 1.5 times a melt temperature of a resin included in a material flowing through the flow passage.

In addition to one or more of the features described above, or as an alternative, the material includes recycled rubber and the elevated temperature is high enough to at least partially melt at least some of the recycled rubber in the portion of the material.

In addition to one or more of the features described above, or as an alternative, the selected geometry is rectangular and the segment includes only two of four sides or the segment includes four sides.

In addition to one or more of the features described above, or as an alternative, the heat source comprises at least one of a ferrous material on at least some of the segment and a conductor situated adjacent the ferrous material for induction heating the segment of the die when electrical current flows along the conductor, a plasma heating assembly, at least one cartridge heater, at least one ultrasonic heater, and at least one burner.

In addition to one or more of the features described above, or as an alternative, the elevated temperature is in a range from 1.5 to 3 times the melt temperature.

In addition to one or more of the features described above, or as an alternative, the device includes a second opening configured to introduce a second material into at least one side of the die.

In addition to one or more of the features described above, or as an alternative, the material establishes a first surface characteristic of a portion of the insert and the second material establishes a second surface characteristic along at least one lateral edge of the insert.

In addition to one or more of the features described above, or as an alternative, the material establishes a first color of a portion of the insert and the second material establishes a second color along at least one lateral edge of the insert.

Various features and advantages will become apparent to those skilled in the art from the following detailed description of example embodiments. The drawings that accompany the detailed description can be briefly described as follows.

BRIEF DESCRIPTION OF THE DRAWINGS

FIG. 4 is a flow chart diagram summarizing an example method of making an extruded article having desired surface characteristics.

FIG. 5 diagrammatically and schematically illustrates selected portions of an example die and heat source configuration designed according to an embodiment of this invention.

FIG. 6 diagrammatically and schematically illustrates another example die and heat source configuration designed according to an embodiment of this invention.

FIG. 7 diagrammatically and schematically illustrates selected features of another example die and heat source configuration.

FIG. 8 diagrammatically and schematically illustrates selected features of another example die and heat source configuration.

FIG. 9 diagrammatically and schematically illustrates selected features of another example die and heat source configuration.

FIG. 19 illustrates a material flow control feature of the device of FIG. 17.

FIG. 20 illustrates a flow control feature of the device in a view taken along the lines 20-20 in FIG. 17.

DETAILED DESCRIPTION

Figures 1, 2, 3:
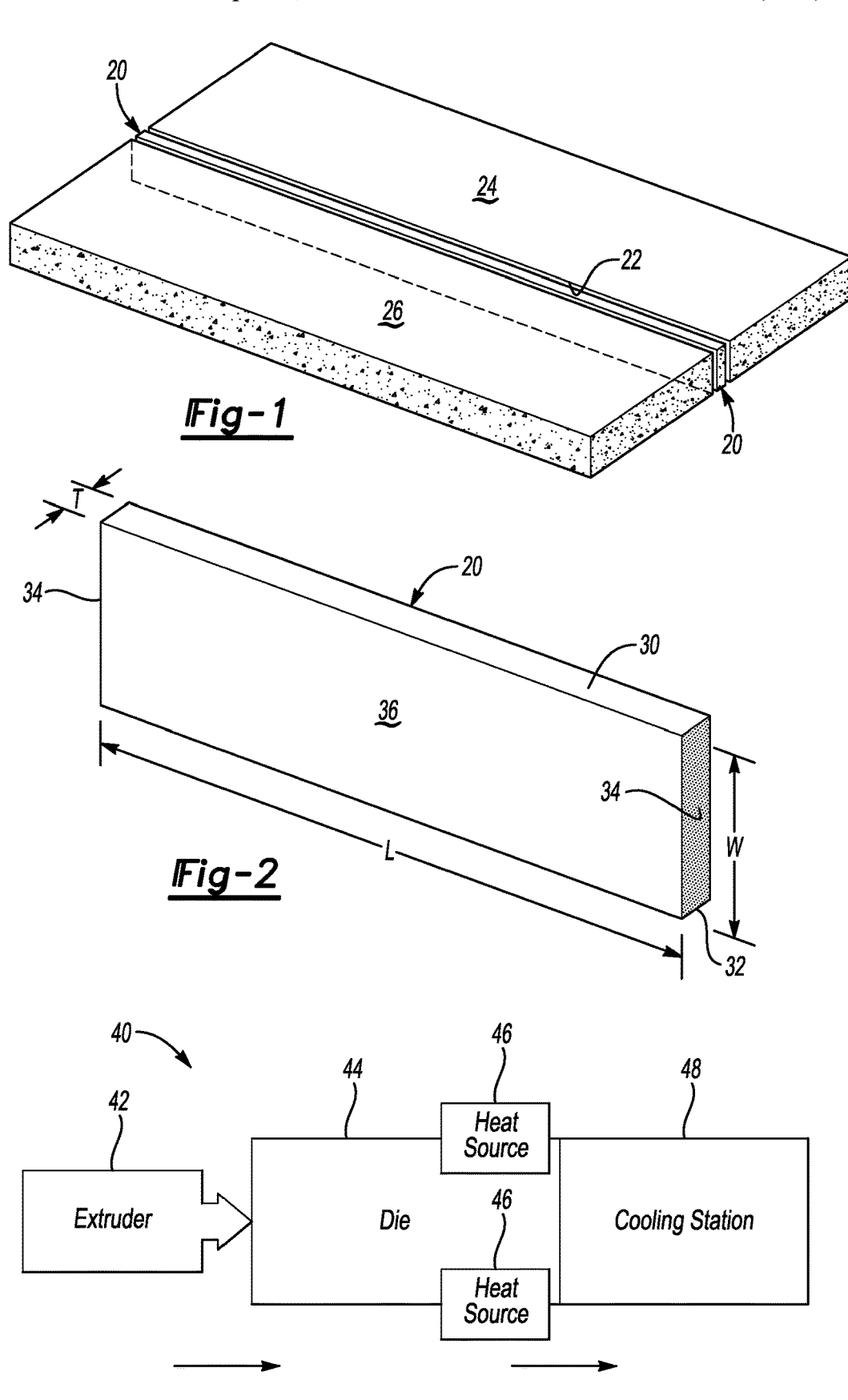
FIG. 1 diagrammatically illustrates a concrete expansion joint including an insert designed according to an embodiment of this invention.
FIG. 2 is a perspective illustration of the example embodiment of a concrete expansion joint insert also shown in FIG. 1.
FIG. 3 schematically illustrates an example embodiment of a device for making an extruded article having desired surface characteristics, such as the concrete expansion joint insert shown in FIGS. 1 and 2.

FIG. 1 shows a concrete expansion joint insert 20 within an expansion joint 22 between two sections or slabs of concrete 24 and 26.

FIG. 2 illustrates an example embodiment of a concrete expansion joint insert 20. In this example, the insert 20 includes a body having longitudinal edges 30 and 32 that extend between ends 34 of the body. Side surfaces 36 are between the longitudinal edges 30 and 32 and between the ends 34.

The insert 20 is made to size without requiring cutting sheets of the insert material into individual strips. The insert 20 of FIG. 2 is molded by extrusion with a width W and thickness T. The extruded material forming the insert 20 may be cut to length to have a finished length L. The length L and thickness T correspond to dimensions of the longitudinal edges 30 and 32, respectively. The thickness T and width W correspond to dimensions of the ends 34. The width W and length L correspond to dimensions of the side surfaces 36.

In various example embodiments, the width W varies between two inches and twelve inches. Many concrete installations include slabs that have a thickness or depth on the order of 3.5 inches, 4 inches or 6 inches. The width W of the insert 20 is selected to correspond to the depth of the concrete in such examples.

The thickness T may vary between one-quarter of an inch and one inch. Many expansion joints have a gap size of approximately one-half of an inch and the insert 20 will have a thickness T of one-half of an inch for such installations.

Extruding a concrete expansion joint insert to size (i.e., with the width and thickness dimensions the insert will have when installed at a job site) has previously been extremely difficult when using recycled rubber as a base material of the insert. Traditional extrusion devices and techniques do not allow for achieving an acceptable surface along the longitudinal edges of the insert. The embodiments disclosed in this description and represented in the drawings overcome that challenge.

FIG. 3 schematically shows a system 40 for making the insert 20 with the thickness T and width W dimensions of the finished insert product. An extruder 42 includes a screw mechanism (not specifically illustrated) for feeding material, such as recycled rubber and a resin, into a device that forms the extrudate in the shape of the insert 20. The forming device includes a die 44 and a heat source 46 that heats only a segment of the die 44. The material moves through the die 44 into a cooling station 48 where the extrudate is exposed to a cooling fluid.

FIG. 4 is a flowchart diagram 50 that summarizes a method of making the insert 20 using a system like the system 40 schematically shown in FIG. 3. At 52, the material, such as recycled rubber and resin, moves through the die 44. The resin of the material has a melt temperature and much of the material within the die 44 has a temperature that corresponds to the melt temperature of the resin. At 54, the temperature of only a segment of the die is increased to an elevated temperature that is at least 1.5 times the melt temperature of the resin. In example embodiments, the elevated temperature is in a range from 1.5 to 3 times the melt temperature of the resin. At 56, the temperature of a portion of the material is increased to an increased temperature above the melt temperature. The temperature increase at 56 is achieved through contact with interior sides of the segment of the die that has the elevated temperature.

Heating or increasing the temperature of only a segment of the die and exposing a portion of the material to that elevated temperature as the material moves through the die achieves a desired surface along the longitudinal edges 30, 32 of the resulting insert 20. In some embodiments, the finished surface along the longitudinal edges 30 and 32 is a smooth, flat and continuous surface along the entire thickness T and length L of each longitudinal edge 30, 32.

FIG. 5 shows an example embodiment of the die 44. The material of the insert enters the die at an inlet side 60 and moves through a flow passage of the die 44 that ends in an exit 62. In this example embodiment, because the insert 20 has a rectangular cross section, the flow passage is rectangular and a geometry of the exit 62 is rectangular. The flow passage inside the illustrated die 44 has four sides 64, 66, 70 and 72. The sides 64 and 66 correspond to the side surfaces 36 of the insert 20 and the sides 70 and 72 correspond to the longitudinal edges 30 and 32, respectively.

The heat source 46 in this embodiment includes a ferromagnetic material on the segment of the die 44 that has an increased temperature relative to a remainder of the die 44. In this example, ferromagnetic material pieces 74 are secured to the body of the die 44 along the outer edges aligned with the sides 70 and 72 of the flow passage. A conductor 76 is coiled around the die 44 and situated adjacent the ferromagnetic material pieces 74. The conductor 76 includes multiple coil windings. The illustration appears to show a single winding for simplicity and to allow for the ferromagnetic material pieces 74 to be visible in the drawing.

As electrical current flows along the conductor 76, a resulting magnetic field induces an increased temperature of the ferromagnetic material pieces 74. The heat source 46 of this example embodiment uses inductive heating for increasing the temperature of a segment of the die 44 near the exit 62 to the elevated temperature that is higher than the melt temperature of the resin of the extruded material. The elevated temperature of that segment of the die 44 is higher than a temperature of the remainder of the die 44. In the embodiment shown in FIG. 5, the heated segment includes less than the entirety of all four sides 64, 66, 70 and 72. In this embodiment, only the sides 70 and 72 are heated to the elevated temperature by the heat source 46.

The elevated temperature of the segment of the die is at a much higher temperature than would typically be used in an extrusion process. The heat source 46 of the illustrated example embodiments, therefore, superheats the segment of the die 44.

As the material moves through the flow passage of the die 44 in FIG. 5, the portion of the material that contacts the sides 70 and 72 near the exit 62 is heated to a temperature higher than the temperature of a remainder of the material, which is the melt temperature of the resin or close to that melt temperature. That additional heating and the resulting temperature increase facilitates forming smooth longitudinal edges 30 and 32 of the resulting insert 20. The segment of the die 44 including the sides 70 and 72 at the elevated temperature effectively irons the material along the sides of the extrudate that result in the longitudinal edges 30 and 32 of the insert 20.

The body of the die 44 comprises a non-ferromagnetic material so that the inductive heating focuses the increased temperature only at the segment that is useful for achieving the desired surface finish along the longitudinal edges 30 and 32. Inductively heating ferromagnetic material that is strategically placed along only a segment of the die 44 allows for isolating the increased temperature used for achieving the desired surface finish along the longitudinal edges 30 and 32.

FIG. 6 shows another example embodiment that utilizes inductive heating for increasing the temperature of the segment of the die 44. In this example, the pieces 74 of ferromagnetic material extend away from the body of the die 44 sufficiently to allow the conductor 76 to be coiled around the pieces 74 without wrapping around the body of the die 44 like the conductor 76 in the embodiment shown in FIG. 5.

FIG. 7 shows another example configuration of ferromagnetic material 74 secured to the body of the die 44, which otherwise is made of a non-ferrous material. The ferromagnetic material 74 in this example effectively envelops or wraps around the segment of the die 44 such that all interior sides of the flow passage are superheated by inductive heating to the elevated temperature. Such embodiments use the elevated temperature to ensure a desired smoothness along the longitudinal edges 30 and 32 and the side surfaces 36 of the insert 20. The conductor 76 is not illustrated in FIG. 7.

While the embodiments shown in FIGS. 5-7 have ferromagnetic material pieces 74 secured to the body of the die 44, other embodiments include ferromagnetic material incorporated into the body of the die 44 only in the segment of the die 44 that is to be heated by inductive heating.

FIG. 8 shows an example embodiment in which the exit 62 is made of ferromagnetic material that may be a separate piece secured to the body of the die 44 or incorporated into the material of the body as part of the process of forming the die 44. This is another example that includes superheating all sides of the segment of the die 44 to the elevated temperature to effectively iron all sides of the extrudate passing through the exit 62.

FIG. 9 shows an example embodiment in which the heat source 46 comprises cartridge heaters 78 that are positioned within the body of the die to superheat the segment of the die 44 to the elevated temperature. The heater cartridges 78 in this example have a known configuration including a generally cylindrical exterior that fits within holes established in the body of the die 44.

Figures 10, 11, 12:
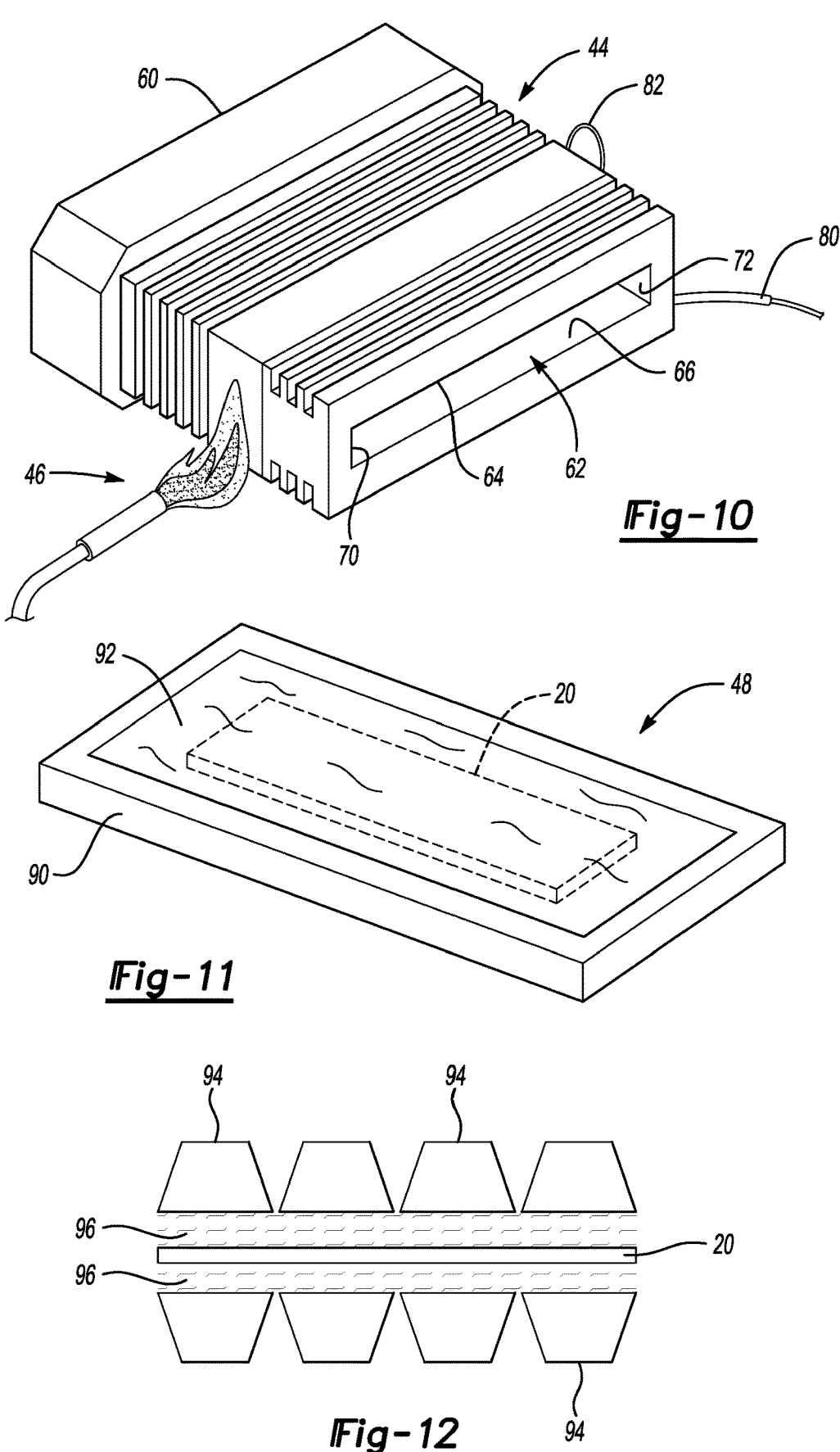
FIG. 10 diagrammatically and schematically another example die and heat source configuration.
FIG. 11 diagrammatically illustrates an example configuration of a cooling station.
FIG. 12 diagrammatically illustrates another example configuration of a cooling station.

Another example embodiment is shown in FIG. 10. The heat source 46 in this embodiment includes a burner 80 that directs a flame 82 at the segment of the die 44 where the second, increased temperature is required.

The heat source 46 in other embodiments comprises a plasma heating assembly for superheating the segment of the die 44.

The second temperature used for achieving the desired surface finish on the longitudinal edges 30 and 32 depends, in part, on the selection of the material used to make the insert 20. In one example embodiment, the insert material comprises recycled rubber and a high melt plastic resin, such as polypropylene, low density polyethylene (LDPE), or high density polyethylene (HDPE). Such resins are useful in combination with rubber for the material of the insert 20 because they and other olefins are capable of bonding to rubber.

A high melt plastic resin is desirable in some embodiments because of its flow characteristics. High melt plastic resins useful in example embodiments have a melt flow index in a range from 5 to 35 using a standard to measure mass in grams extruded in 10 minutes at a constant temperature, such as 190° C. (i.e., a range from 5 g/10 min to 35 g/10 min).

A high melt plastic resin is able to more fully surround the pellets or particles of recycled rubber and achieve a desired density of the resulting insert 20. Another feature of a high melt plastic resin is that a lower resin content can be used compared to fractional melt resins, for example. A lower resin content reduces the cost of the end product. An example embodiment includes approximately 80% by weight recycled rubber and approximately 20% by weight of the resin. An example embodiment includes 22% resin by weight.

When the material of the insert 20 is approximately 20% resin, the resulting insert 20 is lighter weight compared to others including higher resin content. Some example embodiments include about two-thirds as much resin as previously made inserts that include rubber and resin. Reduced resin content also provides the advantage of reducing the material cost of the insert 20.

Concrete expansion joint inserts must meet compression testing according to the ASTM 1751 standard. Increasing an amount of plastic in an expansion joint insert not only introduces additional cost but changes the compressibility characteristics. Too much plastic within the insert material makes the insert less compressible. That is one of the reasons why changing the material composition has not proven successful when attempting to achieve a desired surface along the longitudinal edges of a concrete expansion joint insert. The disclosed method and devices, however, allow for using an insert material comprising rubber, such as recycled tire rubber, and resin that satisfies standard compressibility requirements while achieving desired surface finishes on all sides of the insert without requiring additional machining or cutting.

FIG. 11 shows an example cooling station 48. In this embodiment, a bath 90 contains a cooling fluid 92, such as water. The extrudate leaving the exit 62 of the die 44 is immediately immersed in the cooling fluid 92 within the bath 90. Immediately cooling the extrudate leaving the exit 62 of the die 44 results in a stronger end product.

FIG. 12 shows another example embodiment of the cooling station 48. In this embodiment, sprayers 94 are situated to spray cooling fluid 92, such as water, onto all sides of the extrudate as it leaves the exit 62 of the die 44. One feature of utilizing sprayers 94 to simultaneously expose all sides of the extrudate the cooling fluid is that it eliminates cupping and provides more consistent results.

Figure 13:
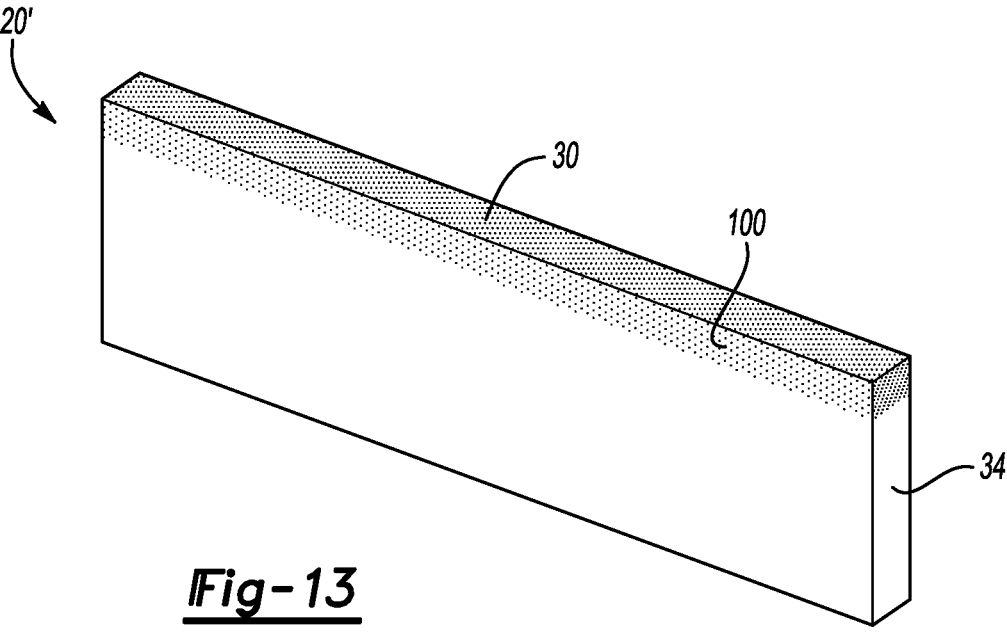
FIG. 13 diagrammatically illustrates an example embodiment of a concrete expansion joint insert including a modified portion along at least one edge.

FIG. 13 shows another example embodiment of a concrete expansion joint insert 20'. A portion 100 of the insert 20' that includes the longitudinal edge 30 is modified compared to a remainder of the insert 20'. The modified portion 100 is a result of additional processing subsequent to forming a base of the insert 20'. The modified portion 100 may differ from the remainder of the insert 20' by including a different surface finish, a different material composition, a different color, a different stiffness, a different durability, or a combination of at least two of these characteristics.

In an example embodiment, the insert 20' is made of a material including recycled rubber and the majority of the body of the insert is black. The portion 100 has a lighter color, such as grey, that resembles the color of cured concrete. The portion 100 and the edge 30 in particular may be situated during installation so the colored edge 30 is adjacent the exposed surface of the concrete.

Figure 14:
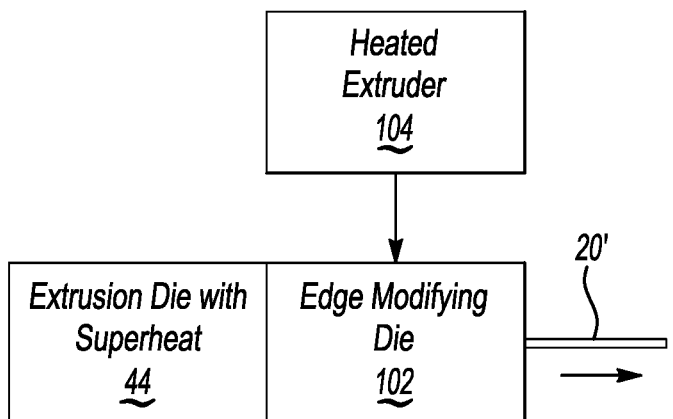
FIG. 14 schematically illustrates a process of making embodiments like that shown in FIG. 13.

FIG. 14 schematically illustrates a process of making inserts, such as the insert 20' shown in FIG. 13, that include a modified edge 30. The die 44 in FIG. 14 may be any of the dies 44 described above and shown in FIGS. 5-10. A modifying die 102 introduces material from a heated extruder 104 along one edge of the material exiting the die 44. The modifying die 102 urges material from the heated extruder 104 into contact with one of the super-heated lateral edges of the material exiting the die 44.

The modifying die 102 forms the material from the heated extruder 104 into the portion 100. In some embodiments, the material introduced by the die 102 can be considered bonded to the superheated lateral edge of the material exiting the die 44. In some embodiments, the modifying material is at least partially embedded into the superheated material exiting the die 44. Once the insert 20' exits the modifying die 102, the portion 100 is distinguishable from the remainder of the insert, which can be visually observed or otherwise determined, depending on the resulting characteristics of the modification.

Considering an embodiment in which the portion 100 has a different color than a remainder of the insert 20', the modifying material introduced by the die 102 comprises a mixture of rubber and high melt plastic resin. In some embodiments, the rubber comprises between 50% and 75% by weight and between 25% and 50% by weight resin. The particular ratio of rubber to resin within those ranges may vary depending on the particulars of the rubber and resin used. For example, rubber granules or pellets that are %18, 40 mesh, 80 mesh or 200 mesh are included in some embodiments. Combinations of differently sized granules or pellets are included in some color modifying materials.

The color modifying material is heated within the heated extruder 104 to a sufficiently high temperature to melt at least the resin and to achieve a satisfactory bond between the modifying material exiting the die 102 and the material exiting the die 44. In an example embodiment, the temperature of the extruder 104 is about one-half the temperature used to superheat the lateral edges in the die 44.

The resin of the color modifying material dictates the resulting color of the portion 100 of the insert 20'. When the resin is combined with the rubber and heated, the resulting color will typically be different than the color of the resin alone. The heat applied in the extruder 104 and the rubber in the mixture alter the color of the portion 100 resulting from the process schematically illustrated in FIG. 14. Those skilled in the art who have the benefit of this description will be able to select an appropriate combination to achieve a desired color of the portion 100.

In some embodiments, the modified portion 100 has increased durability compared to the rest of the insert 20'. Such durability makes the material less susceptible to damage or wear over time.

In some embodiments, the modified portion 100 is stiffer than a remainder of the remainder of the insert 20'. Having a stiffer or more rigid portion 100 stiffens the insert 20', which can facilitate handling the insert during packaging and on a job site where the insert 20' is installed.

Figure 15:
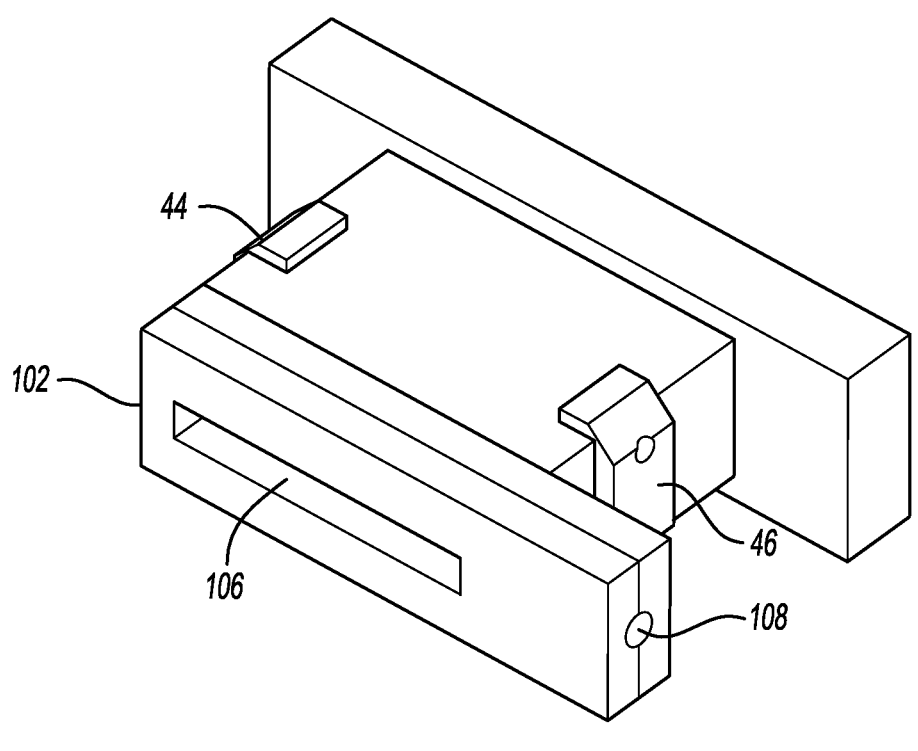
FIG. 15 diagrammatically illustrates an example die useful for modifying a portion of an expansion joint insert.
Figure 16:
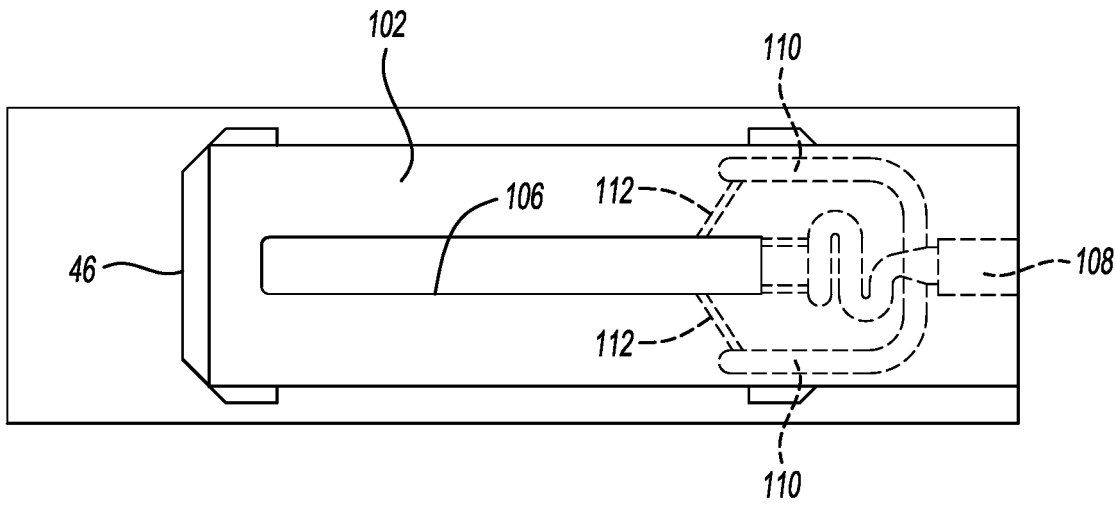
FIG. 16 shows selected features of the die shown in FIG. 15.

FIGS. 15 and 16 show an example die 102 having an inlet (not visible) adjacent the outlet of the die 44 and an outlet 106. An opening 108 receives the material from the heated extruder 104. Passages 110 within the die 102 direct the material toward one of the superheated edges of the insert material as that material exits the die 44 and moves through the die 102. Angled injection passages 112 are positioned to introduce the modifying material along a border between the modified portion 100 and the remainder of the insert 20'. For example, the border is situated a fraction of an inch from the lateral edge 30.

Figures 17, 18:
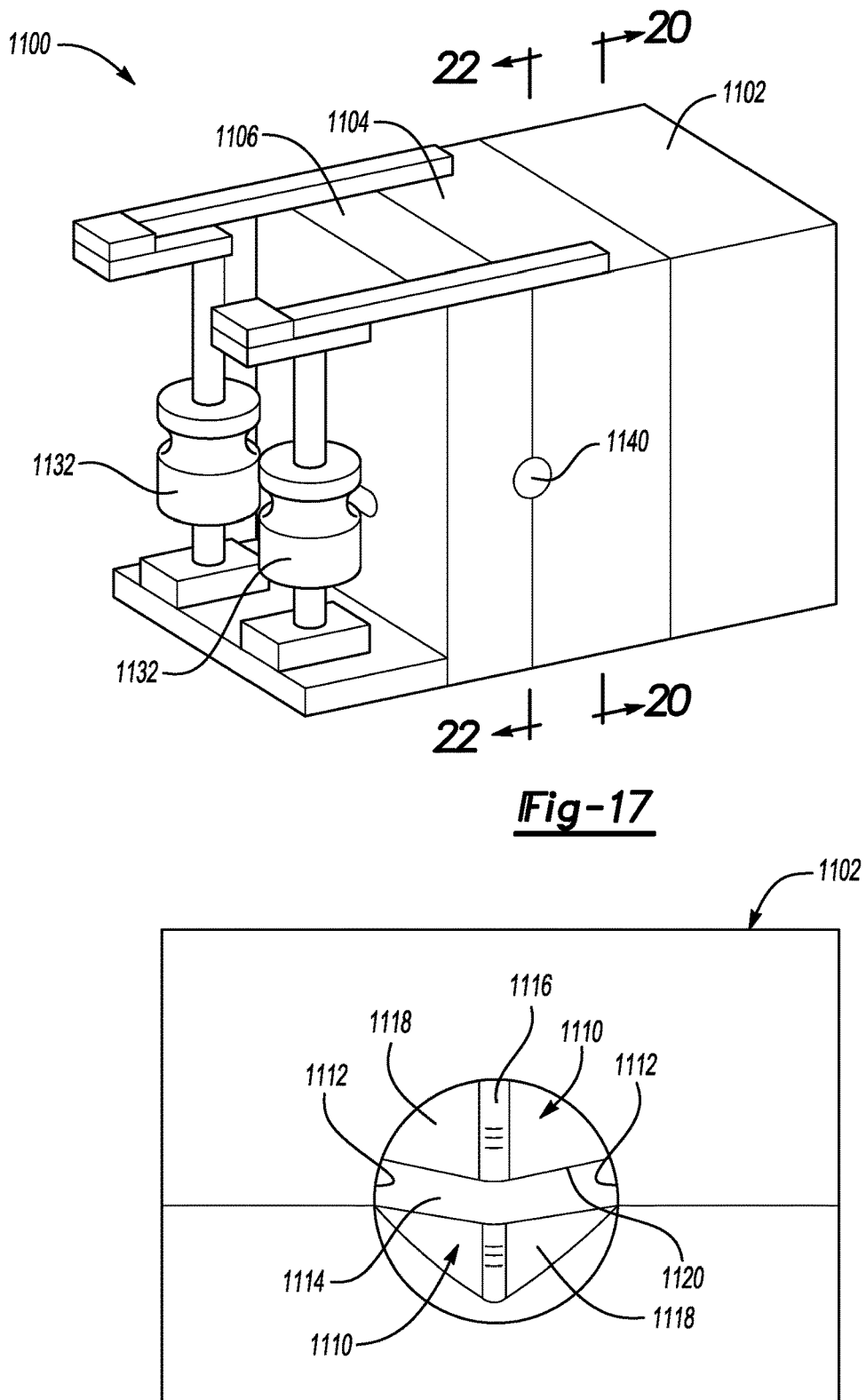
FIG. 17 diagrammatically illustrates selected portions of a device for manufacturing concrete expansion joints according to an example embodiment.
FIG. 18 illustrates features of the device of FIG. 17 as seen from an entrance side.

FIG. 17 illustrates features that are included with some of the example devices for making an insert described above. The device 1100 of this example includes a unique die flow path configuration designed to control how extruded material, such as recycled rubber, flows through the device 1100. The example device 1100 can be considered to have three sections including an entrance section 1102 that is configured to be coupled to an extruder (not shown in FIG. 17), an intermediate section 1104, and an exit section 1106. The exit section 1106 includes one or more of the example arrangements discussed above to selectively superheat at least one portion of the expansion joint extrudate. The superheating feature is not explicitly shown in FIG. 17. The extruder coupled to the entrance section 1102 in some embodiments comprises a known single screw extruder configuration.

One challenge associated with realizing an insert 20 sized for use as described above (e.g., not requiring a large sheet to be cut into strips sized for use) is achieving proper material flow through a die. As can be appreciated from FIGS. 18 and 19, the illustrated example includes at least one flow control feature 1110 inside the entrance section 1102 that directs some of the extruded material (e.g., recycled rubber) away from a center or middle of the flow path 1111 and toward outer edges 1112 of the flow path 1111. Some of the extruded material is directed away from the center or middle of the flow path 1111 while a remainder of the material is allowed to flow through the middle of the flow path. This example flow control feature 1110 includes two wedges. Urging or directing some material outward along the wedges 1110 effectively decreases the amount of material near the center of the flow path 1111 at least along a portion of the flow path 1111 while effectively increasing the amount of material flowing closer to the outer edges 1112 compared to the amount of material that would be along the outer edges without the flow control feature 1110.

Without the wedges 1110 or another flow control feature to direct material flow in this manner, there would be a tendency for more material along the middle portion of the flow path 1111 because there otherwise would be less flow resistance along the middle portion of the flow path 1111 resulting in inconsistent material thickness or density on different portions of the resulting product. The flow directing and restricting wedges 1110 contribute to achieving a consistent and desired material composition for the entire insert 20.

In this example the wedges 1110 interrupt or partially fill a conical passage 1114 of the entrance section 1102. The wedges 1110 each have a leading edge 1116 that is rounded off in this example. Side edges 1118 of the wedges are planar and have a decreasing dimension in a flow direction through the entrance section 1102 (e.g., right to left in FIG. 17 or into the page in FIG. 18). Opposing surfaces 1120 of the wedges 1110 face each other and are spaced apart in this example by a distance corresponding to a desired thickness T of an insert 20 formed through the device 1100. The space between the opposing surfaces 1120 allows some of the extruded material to flow between those surfaces and through the middle of the flow path 1111.

FIG. 20 shows another flow control feature, which is included in the intermediate section 1104 of the example device 1100. The outside edges 1122 of the flow path 1111 through the intermediate section have an increased cross-sectional area compared to the cross-sectional area of the final edges of an insert 20 formed by the device 1100. The outside edges 1122 in this example have a rounded profile and a dimension 1124 in the thickness direction (i.e., T in FIG. 2) of the resulting insert 20 that exceeds the spacing between the opposing surfaces 1120 of the wedges 1110. The profile and dimensions of the outside edges 1122 decreases flow resistance along the outer edges, which contributes to ensuring that a consistent amount of material is provided near an exit of the device 1100 across the entire width (i.e., W in FIG. 2) and thickness of the resulting insert 20.

Increasing flow resistance near a middle of the flow path 1111 with the wedges 1110 and decreasing flow resistance near edges of the flow path 1111 with the size and profile of the outside edges 1122 facilitate realizing a user-sized strip of material that is useful as a concrete expansion joint insert 20 that can be made of materials such as extruded recycled rubber and polyethylene. The flow control features of the device 1100 prevent extruded material from flowing down a center of the flow path 1111 at a faster rate than along the outer edges of the flow path 1111. Diverting additional material toward the outside edges 1112, 1122 provides a more even or equal flow rate across the flow path 1111. A consistent flow rate in the exit section 1106 provides desired product characteristics of a concrete expansion joint insert designed according to an embodiment of this invention.

Figure 21:
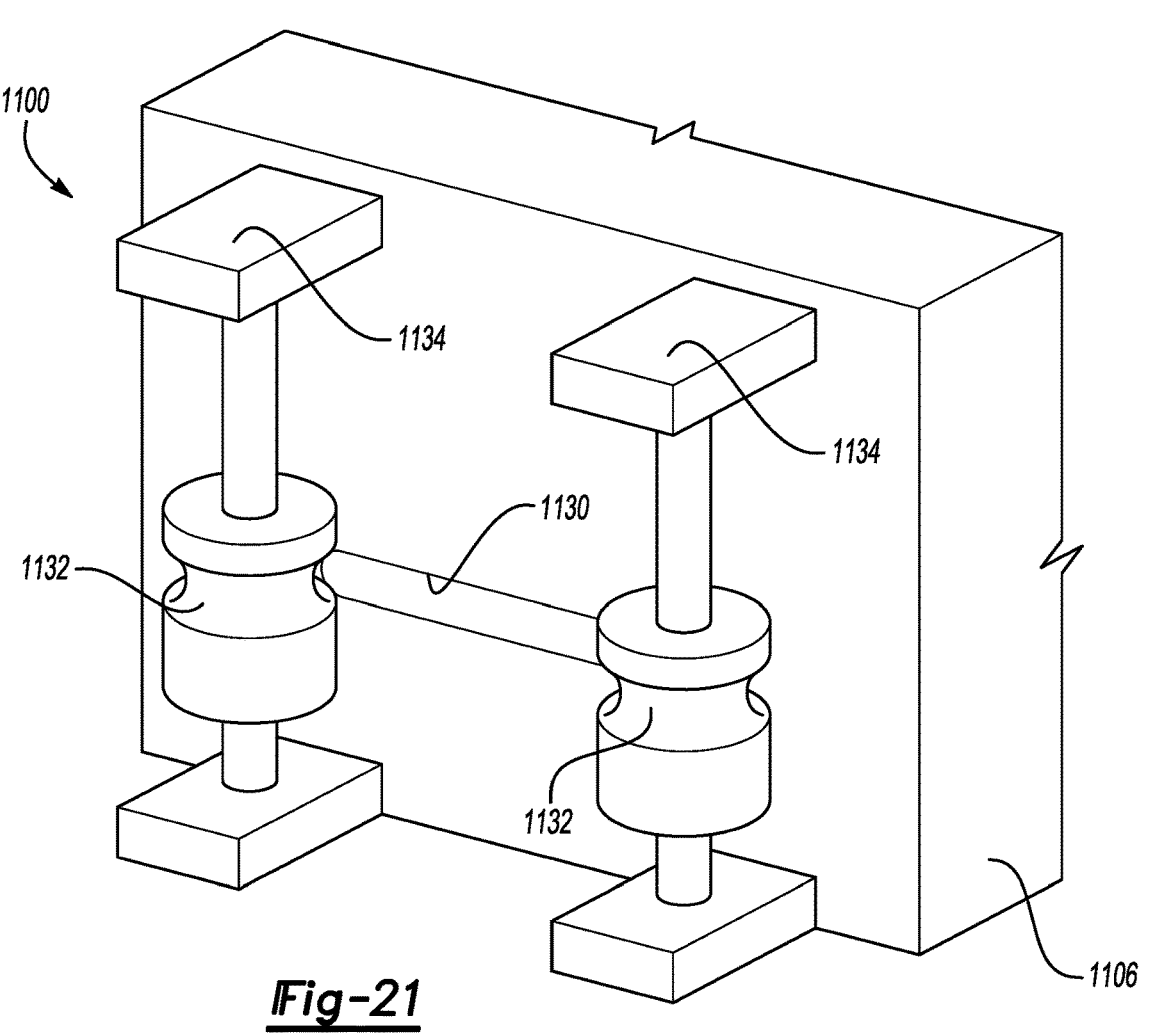
FIG. 21 illustrates features of the device of FIG. 17 as seen from an exit side.

FIG. 21 shows an exit side of the exit section 1106 of the device 1100. A final opening 1130 has a profile corresponding to the desired final profile of the insert 20 including the width and thickness (W and T) of the insert 20. The dimensions of the opening 1130 may vary from the final product dimensions depending on the selected material and whether the material shrinks during curing, for example.

The illustrated example also includes finishing rollers 1132 that provide a profile finishing edge along which at least one of the longitudinal edges of the insert 20 is received as the extruded insert material exits the device 1100. The rollers 1132 in some embodiments are passive and rotate in response to movement of the extruded material. In the illustrated example, the rollers 1132 rotate at a selected speed and are propelled by a motor 1134. The rollers 1132 in this example rotate at a speed corresponding to the speed at which the extrudate exits the opening 1130. A motor controller is configured to adjust the speed of the motor 1134 as needed to maintain a desired finish on the edges of the insert 20.

For some materials, such as recycled rubber, the combined effect of the wedges 1110, the configuration of the outside edges 1122 and the temperature control mentioned above allows for achieving a desired surface along the longitudinal edges 30, 32 of the insert 20. Depending on the material choice and desired configuration of the insert less than all of the wedges 1110, the outside edges 1122 and the temperature control may be enough to achieve a satisfactory quality product.

Figure 22:
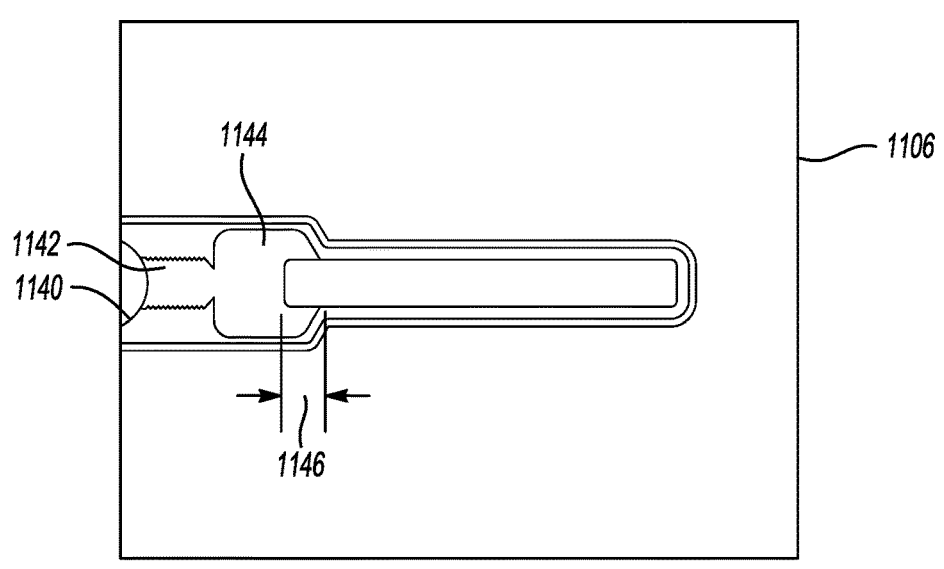
FIG. 22 illustrates another feature of the device of FIG. 17 in a view taken along the lines 22-22 in FIG. 17.

The example embodiment of FIG. 17 includes a second material port 1140 also shown in cross-section in FIG. 22. The second material port 1140 is configured to introduce a second material onto at least one longitudinal edge 30, 32 of the insert 20 prior to the body of the insert exiting the device 1100. In this example, as the material, such as recycled rubber, proceeds through the flow path 1111 of the device 1100 a second material, such as recycled rubber including a colorant or recycled low density polyethylene, is introduced into a side of the flow path 1111 and onto the material of the body. In this way, the device 1100 facilitates coextruding two different materials to form the insert 20. The extruder (not illustrated in FIG. 17) that delivers the second material into the port 1140 may be a single screw or twin screw extruder, for example.

In the illustrated example, the second material port 1140 includes a threaded connection 1142 and opens into a groove 1144 that intersects the flow path 1111 at an interface between the intermediate portion 1104 and the exit portion 1106. The groove 1144 intersects the flow path 1111 near the exit of the device 1100 in this example and introduces the second material into the flow path 1111 at sufficient pressure to take up some of the space within the flow path 1111 at the corresponding edge. The amount of the second material on the corresponding longitudinal edge 30, 32 may be controlled by controlling the pressure at which the second material is introduced into the groove 1144. Those skilled in the art who have the benefit of this description will realize how to achieve a desired amount of second material (e.g., thickness or depth of a coating) on the resulting insert 20.

The example groove 1144 is wider than the flow path 1111 in a direction corresponding to the thickness of the insert 20 (e.g., vertically in FIG. 22). The groove 1144 overlaps the flow path 1111 along a depth shown by the dimension at 1146 in FIG. 22. The dimension 1146 defines a depth over the longitudinal sides of the insert body over which the second material extends adjacent the longitudinal edge 30, 32 to which the second material is applied.

The second extruded material applied to at least one of the longitudinal edges 30, 32 achieves the second surface characteristic, such as those described above. For example, the second material coextruded through the port 1140 and groove 1144 establishes a coating or a different color along the corresponding edge 30 or 32. In embodiments of the device 1100 that have second material ports 1140 and grooves 1144 on both sides of the flow path 1111, the resulting insert 20 will have two longitudinal edges 30, 32 with a selected characteristic that differs from a central portion of the body of the insert.

Various embodiments are illustrated in the drawings and described above. The features or functionality of each embodiment are not necessarily limited to being used in the exact combination shown and described. Other combinations of the features and functionality are possible to yield other embodiments. In other words, the various features described above and shown in the drawings may be used in additional embodiments that are not explicitly shown or described. Additionally, not all of the illustrated and described features are required in every embodiment. Other embodiments include a combination of less than all of the disclosed features of the example embodiments. For example, some embodiments may include a flow control feature near the middle of the flow path without a flow control feature along the edges of the flow path or no flow control feature at all.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

We claim:

1. A method of making a concrete expansion joint insert, the method comprising:

moving a first material including a resin having a melt temperature through a die having a flow passage, the flow passage ending in an exit having a selected geometry, wherein the die comprises a ferrous segment formed with ferrous material and a remainder of the die comprises a non-ferrous material;

increasing a temperature of only the ferrous segment of the die to an elevated temperature that is at least 1.5 times the melt temperature, wherein the ferrous segment is near the exit; and increasing the temperature of a portion of the first material to an increased temperature above the melt temperature through contact with interior sides of the flow passage through the die that correspond with location of the ferrous segment having the elevated temperature, wherein increasing the temperature comprises using induction heating by causing electrical current to flow along at least one conductor situated adjacent the ferrous segment.

2. The method of claim 1, wherein
the material includes recycled rubber; and
the elevated temperature is high enough to at least partially melt at least some of the recycled rubber in the portion of the first material.

3. The method of claim 1, wherein the selected geometry is rectangular and
(i) the segment includes only two of four sides or
(ii) the segment includes four sides.

4. The method of claim 1, comprising introducing a second material into at least one side of the die.

5. The method of claim 4, wherein the first material establishes a first surface characteristic of a portion of the insert and the second material establishes a second surface characteristic along at least one lateral edge of the insert.

6. The method of claim 4, wherein the material establishes a first color of a portion of the insert and the second material establishes a second color along at least one lateral edge of the insert.

7. The method of claim 1, wherein the first material comprises recycled rubber and a resin having a melt flow index that is in a range from 5 to 35 g/10 min.

8. The method of claim 1, wherein the elevated temperature is in a range from 1.5 to 3 times the melt temperature.

9. The method of claim 1, comprising adding a second material including a second resin to at least some of the portion of the first material having the elevated temperature, wherein the second material has a color that is different than the first material.

10. The method of claim 9, comprising heating the second material to a temperature that is lower than the elevated temperature.

* * * * *